(12) United States Patent
Lee

(10) Patent No.: US 6,294,983 B1
(45) Date of Patent: Sep. 25, 2001

(54) EMERGENCY EXIT LIGHT

(76) Inventor: Chi-Hwong Lee, 9th, No. 378, Chang Chun Road, Taipei City (TW)

(*) Notice: Subject to any disclaimer, the term of this patent is extended or adjusted under 35 U.S.C. 154(b) by 0 days.

(21) Appl. No.: 09/609,705

(22) Filed: Jul. 3, 2000

(51) Int. Cl.[7] .............................. G08B 5/00; H05B 39/00; H05B 41/00
(52) U.S. Cl. .............. 340/332; 340/815.45; 340/815.53; 340/815.73; 40/570; 362/362
(58) Field of Search .............................. 340/332, 815.45, 340/815.49, 815.52, 815.53, 815.55, 815.73; 40/541, 544, 570, 572, 573, 575; 362/362, 365, 366, 374, 559, 800, 812

(56) References Cited

U.S. PATENT DOCUMENTS

| | | | | |
|---|---|---|---|---|
| 3,931,689 | * | 1/1976 | Shine ...................................... | 40/570 |
| 4,561,203 | * | 12/1985 | MacDonald, Jr. et al. ............ | 40/570 |
| 5,018,290 | * | 5/1991 | Kozek et al. .......................... | 40/570 |
| 5,611,163 | * | 3/1997 | Smith .................................... | 40/570 |
| 5,729,925 | * | 3/1998 | Prothero ............................... | 40/570 |
| 5,735,498 | * | 4/1998 | Jue et al. ......................... | 248/222.12 |
| 5,739,639 | * | 4/1998 | Johnson ................................ | 315/86 |
| 5,768,814 | * | 6/1998 | Kozek et al. .......................... | 40/570 |
| 5,847,550 | * | 12/1998 | Schie et al. .......................... | 323/222 |
| 5,954,423 | * | 9/1999 | Logan et al. .......................... | 362/235 |
| 5,966,069 | * | 10/1999 | Zmurk et al. ......................... | 340/330 |
| 6,152,581 | * | 11/2000 | Masters et al. ....................... | 362/362 |

\* cited by examiner

*Primary Examiner*—Daniel J. Wu
*Assistant Examiner*—Toan Pham
(74) *Attorney, Agent, or Firm*—Rosenberg, Klein & Lee

(57) ABSTRACT

The present invention relates to an emergency exit light having an installation body having a light fitting and a power supply device inside thereof and an indicating board made of transparent material, words or figures sculptured on the indicating board fixed under the installation body. And the improvement is characterized by the installation body consisting of a main body formed in a squeezing manner by aluminum material, a side plate engaged at the open side of the main body and two side covers fixed at two ends of the main body. The LED is mounted on the lighting circuit board in a manner of series connection while the lighting circuit board is fixed at the lower end of the main body, and the series-connected LED is situated at the top of the indicating board. The power supply device is disposed at the top end of the main body wherein an uninterrupted circuit is fitted to a power supply circuit board. It has a transformer used to transform the mains power to be the required direct current and a set of charging battery to accumulate power for the light fitting. Accordingly, the present invention can considerably reduce the thickness, won't destroy the decoration style and has a brighter and clearer presentation effect.

6 Claims, 5 Drawing Sheets

EMERGENCY EXIT LIGHT

BACKGROUND OF THE INVENTION

1. Field of the Invention

The present invention relates to an emergency exit light, and more particularly to an emergency exit light whose thickness is considerably reduced without destroying the decoration style while the indicating effect is lighter and clearer.

2. Description of the Prior Art

A conventional emergency exit light, as disclosed in Taiwan Pat. No. 254463, 387693, 317352 and 341350 is designed in a manner of light box in which a fluorescent lamp is used as light source emitting from the inside to the outside in order that the words or the figures on the transparent plate can be presented to reach a directing or indicating aim. However, the fluorescent lamp occupies too much space and needs electronic parts such as transformer, stabilizer, etc. Consequently, the thickness of the conventional emergency exit light can't be reduced. It not only occupies much space, but also destroys the style of the original decoration. In addition, it is presented only in a flat manner and not in a projecting way. Another emergency exit light, as disclosed in Taiwan Pat. No. 317351, is presented in a side-projecting manner. However, it also uses the fluorescent lamp which occupies space so that the thickness of the circuit box can't also be reduced and the above-mentioned disadvantages are still present. In addition, the life of the fluorescent lamp is short, and it is unsafe because it will produce heat in using for a long time.

SUMMARY OF THE INVENTION

It is a primary object of the present invention to provide an emergency exit light whose thickness is considerably reduced in order not to occupy much space and not to destroy the style of the decoration.

It is another object of the present invention to provide an emergency exit light in which LED in series connection are used as projecting light source so that it can reach the indicating, light and clear effect.

It is a further object of the present invention to provide an emergency exit light which can be used for a long time and hardly produces heat so that a safe requirement can be reached.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
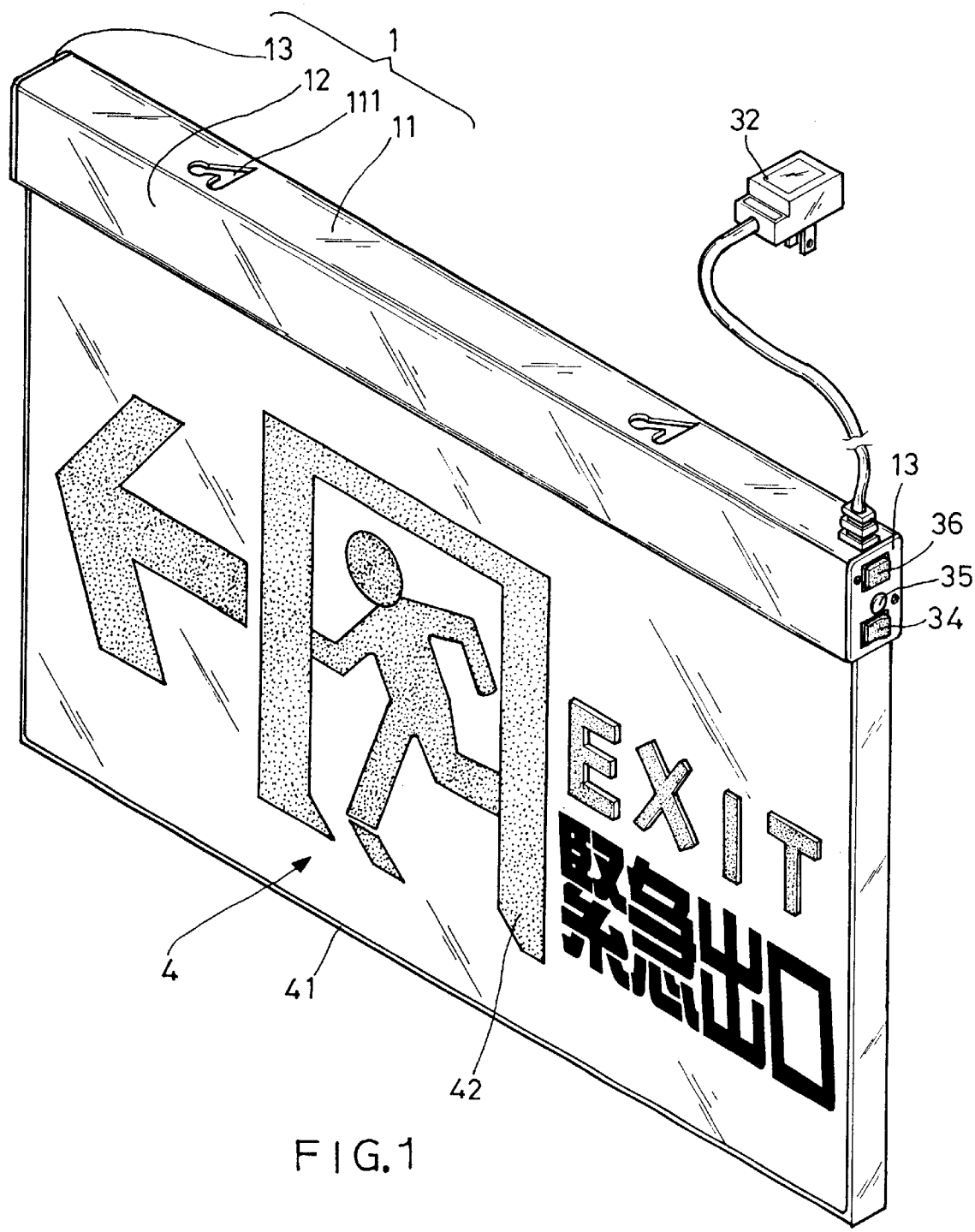
FIG. 1 is a perspective view of an embodiment of the present invention.
Figure 5:
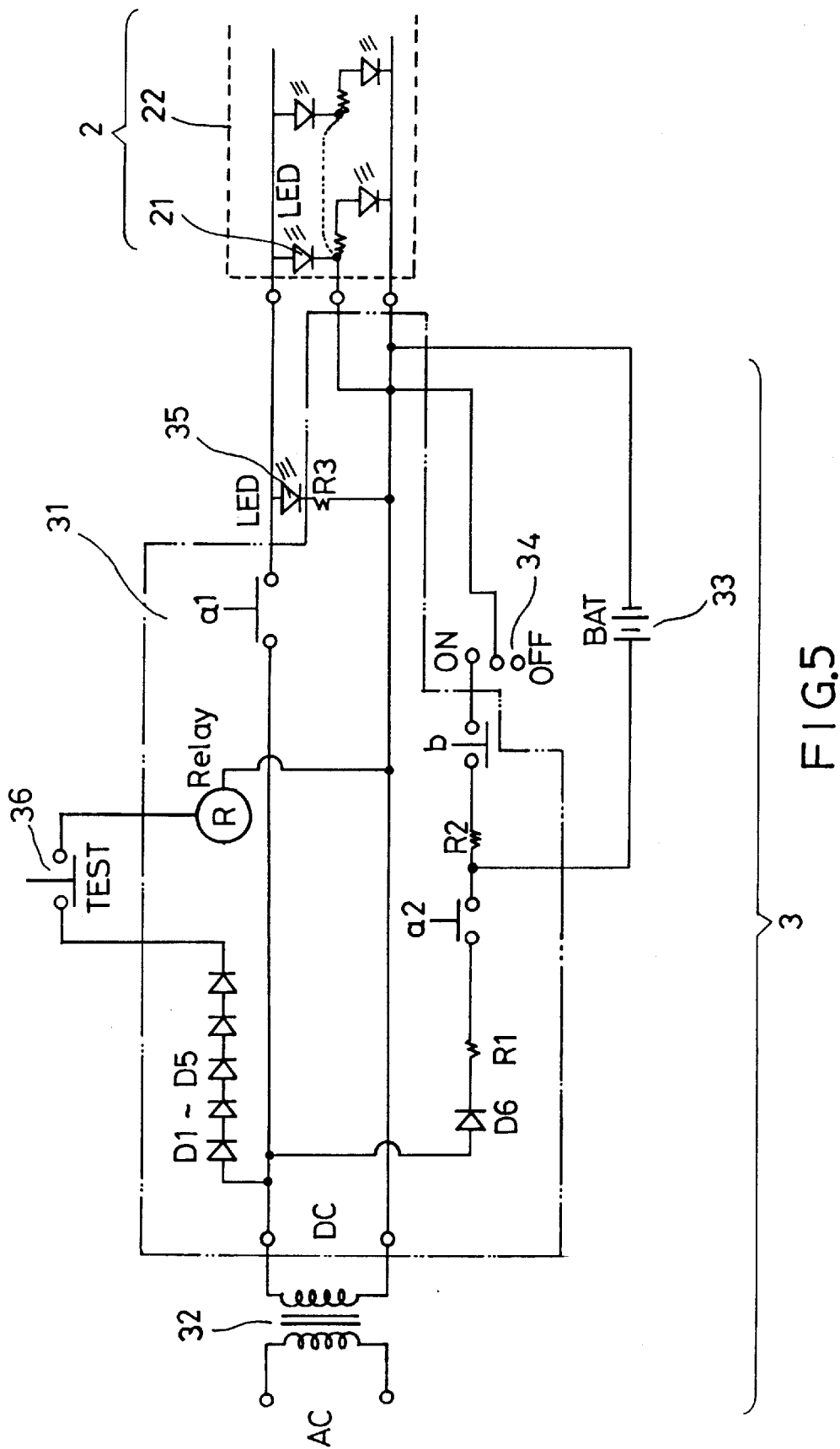
FIG. 5 is a circuit diagram of power supply of the embodiment of the present invention.

First of all, referring to FIGS. 1 and 5, an emergency exit light in accordance with the present invention primarily includes:

an installation body 1 having a light fitting 2 and a power supply device 3 inside thereof; and an indicating board 4 made of transparent material, words or FIGS. 42 sculptured on the indicating board 4 fixed under the installation body 1; wherein the improvement is characterized by:

the installation body 1 consisting of a main body 11 formed in a squeezing manner by aluminum material, a side plate 12 engaged at the open side of the main body 11 and two side covers 13 fixed at two ends of the main body 11;

the light fitting 2 in which LED 21 is mounted on the lighting circuit board 22 in a manner of series connection, the lighting circuit board 22 fixed at the lower end of the main body 11 while the series-connected LED 21 is situated at the top of the indicating board 4 and the power supply device 3 disposed at the top end of the main body 11 wherein an uninterrupted circuit is fitted to a power supply circuit board 31 and having a transformer 32 used to transform the mains power to be the required direct current and having a set of charging battery 33 to accumulate power for the light fitting 2.

In order to conform to the Chinese National Standard (CNS), the power supply device 3 is fitted with a change-over switch 23, a power indicator 35 and a test switch 36 which are mounted on the side cover 13 in order to facilitate the operation required by the function test.

The installation body 1 includes a hanging hole 111 at the rear or at the top side thereof in order to hang it in position.

Furthermore, the indicating board 4 is locked at the bottom side of the main body 11 by means of screws 43. When the side plate 12 is engaged into, the screws 43 are invisible from the front side so that a beautiful appearance is achieved. Moreover, the indicating board 4 is provided with a reflection paper 41 for the reflection of the light source and for increasing the luminosity.

In accordance with the above structure of the present invention, the LED 21 in series connection is used as projection light source while the LED 21 and the required parts can be considerably reduced in volume in comparison with the fluorescent lamp. Accordingly, the thickness of the present invention must be much more reduced than that of the conventional structure while the decoration style won't be destroyed. In addition, the illumination of LED is brighter than that of the fluorescent lamp while the words or FIG. 42 on the indicating board 4 can be shown after projection in a perspective state with greater brightness. Thus, the present invention can considerably reduce the thickness, won't destroy the decoration style and has a brighter and clearer presentation effect.

Accordingly, the present invention can exactly reach the expected effect. The detailed construction and features are described as follows:

1. The installation body 1 consists of the main body 11 formed in a squeezing manner by aluminum material and a side plate 12. Also, the installation body 1 is provided with a projection 112 and a locking groove 113 in order for a sliding groove 121 and a locking body 122 of the side plate 12 to laterally engage into in position. Moreover, they are fixed by means of two side covers 13 and screws 14. Furthermore, the installyation body 1 of different length can be easily created because the main body 11 and the side plate 12 can be cut according to the required length.

2. The LED 21 of the light fitting 2 in accordance with the present invention is disposed on the lighting circuit board 22. Additionally, the main body 11 formed in a squeezing manner by the aluminum material is fitted with a groove 114. Therefore, the light fitting 2 can be rapidly inserted on the main body 11 and connected to the power supply device 3.

Figure 4:
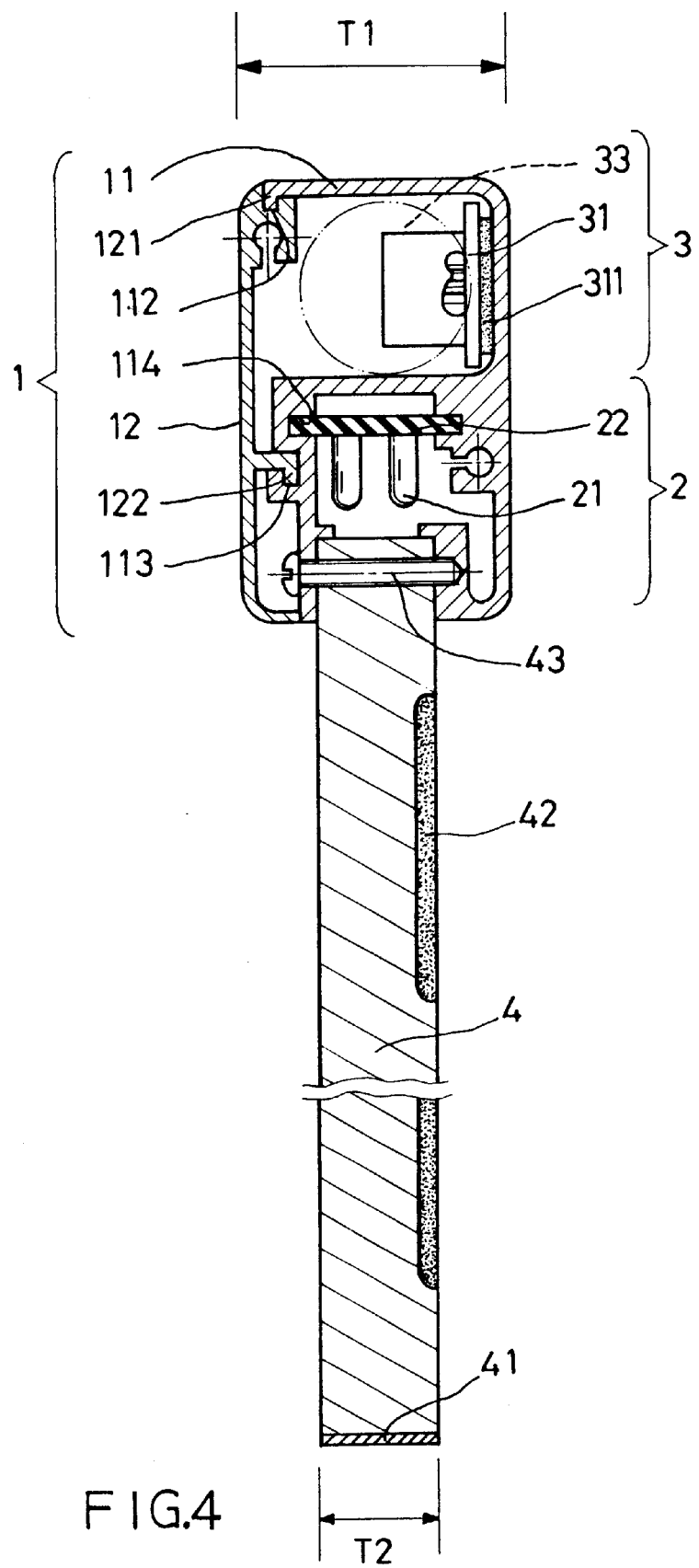
FIG. 4 is a second section of the embodiment of the present invention.

3. The whole design of the power supply device 3 is made in accordance with the limited space of the main body 11. In a word, the electronic parts required by the power supply are mounted on the power supply circuit board 31. Thus, it can be stuck to one side of the upper section of the main body 11 by means of a double-sided adhesive tape 311 at the back thereof while a plurality of charging batteries 33 are connected in series at the center and away from the hanging hole 111. Accordingly, the light fitting 2 and the power supply device 3 can be received in the installation body 1 with a small thickness for a full utilization of the space thereof. As shown in FIG. 4, the thickness (T1) of an installation body 1 of a real product of the present invention only amounts to 2.4 cm while that of the conventional structure fitted with the fluorescent lamp amounts to at least 10 cm. Therefore, much thickness space of the present invention can be saved. Moreover, the thickness (T2) of the indicating board 4 of the present invention approximately amounts to 10 mm. Thus, the present invention is beautiful and quality-oriented in the whole structure.

4. Furthermore, the LED has the feature of saving power and excellent illumination. Though the thickness of the present invention is reduced many times in comparison with the conventional structure in a manner of lamp box, the illumination completely conforms to CNS-standard. Therefore, it is not only beautiful and meets every requirement of fire fighting and safety standard. Besides, the LED has a long using life, is not easily heated and has the high using safety.

Figure 2:
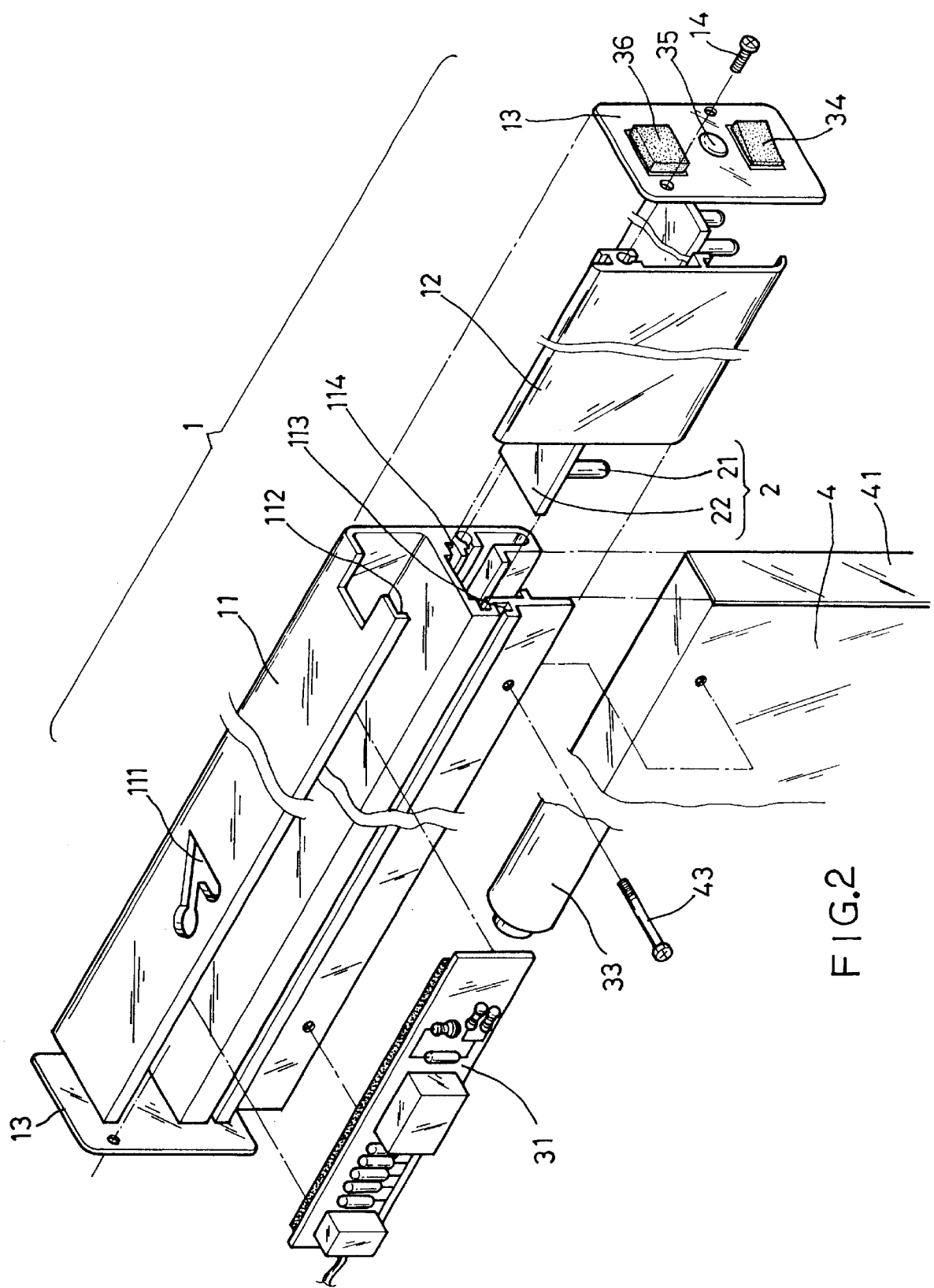
FIG. 2 is an exploded view of the embodiment of the present invention.
Figure 3:
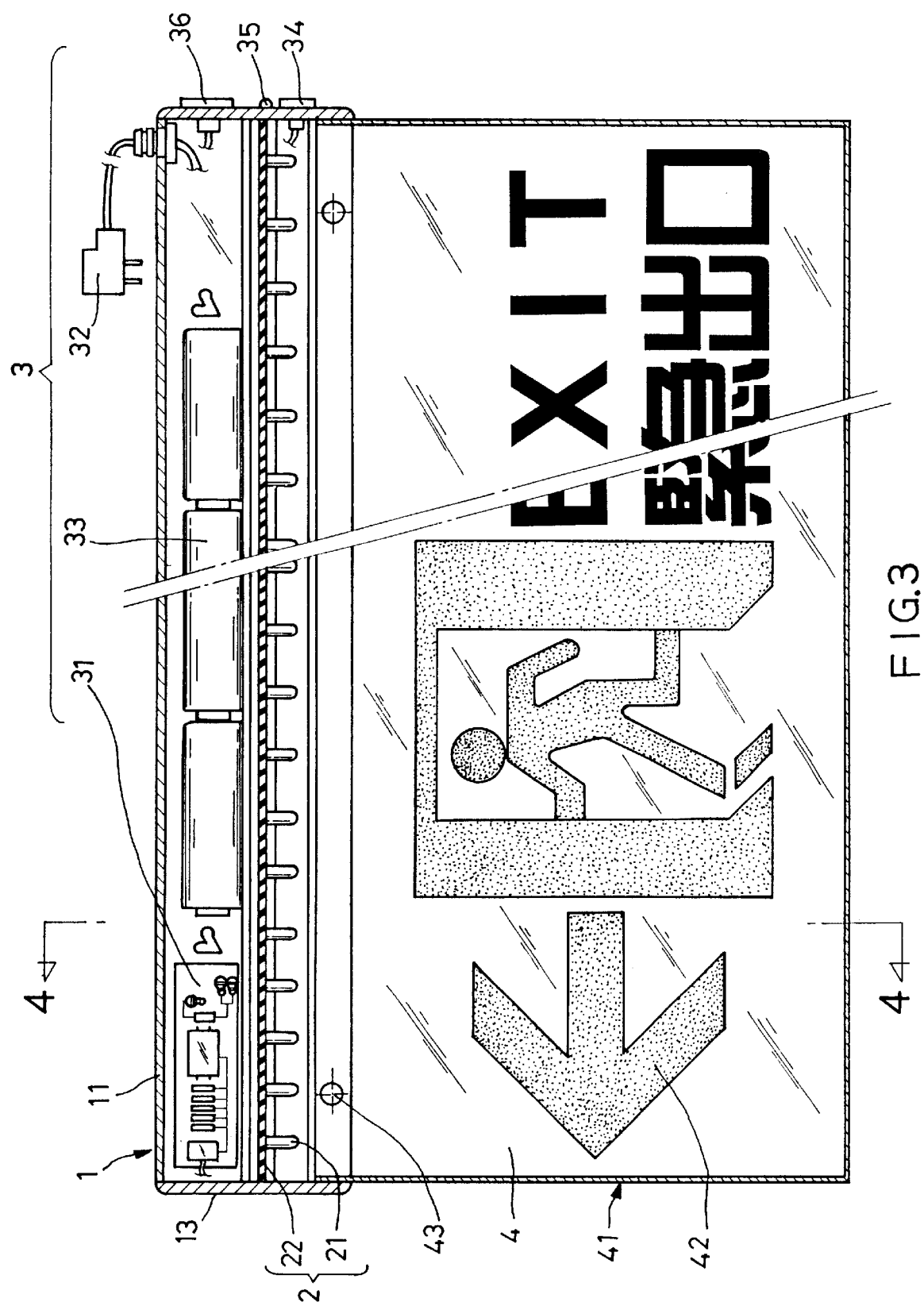
FIG. 3 is a first section of the embodiment of the present invention.

5. In order that the light fitting 2 can also be used during the power failure and conform to the CNS-requirement of maintaining above 90 minutes of illumination time, a power supply device 3 which is small in volume and conforming to the regulations is provided. As shown in FIGS. 1, 2 and 5, an uninterrupted circuit is fitted to a power supply circuit board 31 wherein electronic parts of the uninterrupted circuit are shown as follows:

| part number | Description |
| --- | --- |
| D1~D5 | reduction of the escape time of the relay |
| D6 | avoidance of the self-protection of batteries to the relay during the power failure. |
| R1 | current-limited resistance in charging |
| | current-limited resistance in discharging |
| R3 | current-limited resistance of the power indicator |
| ⓡ | field coil ofrelay |
| a1 | constantly open contact point 1 |
| a2 | constantly open contact point 2 |
| b | constantly open contact point |

As shown in FIG. 5, the alternated current (AC) is transformed to direct current (DC) by means of an externally mounted transformer 32. In the ordinary state, the current is used as the power source for the LED 21 in series connection. During the power failure, the field coil (R) of the relay makes the contact points (a1, a2) to escape in an OFF-state while the contact point (b) is connected in ON-state. Accordingly, the charging battery set 33 supplies power to the LED 21 to maintain an uninterrupted power supply to the power supply device 3. Four charging batteries 33 in one set can provide 90–120 min. power supply for 20 pieces of LED 21 as emergency illumination. In order to test if the function of the charging battery 33 is normal, the test switch 36 can be pressed. Meanwhile, the contact point of the relay will be changed immediately, and it is realized right away if the standard of the safety regulation is met to ensure the household or public safety in emergency. The change-over switch 34 is used to control the charging battery 33 between the ON-state and the OFF-state.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A lighted emergency sign comprising:

(a) an installation body including a main body member having front and rear downwardly projecting portions defining a longitudinally directed channel;

(b) an indicating board coupled to suspend from said installation body, said indicating board being at least partially transparent and having predetermined indicia formed thereon, said indicating board including a longitudinal upper edge portion extending into said installation body channel;

(c) a light fitting coupled to said installation body for illuminating said indicating board, said light fitting including a lighting circuit board and a plurality of series connected LED devices coupled thereto, said LED devices being disposed in said installation body channel spaced from said upper edge portion of said indicating board; and, (d) a power supply device disposed in said main body member coupled to said light fitting, said power supply device including an uninterrupted circuit formed on a power supply circuit board, a transformer, and at least one charging battery.

2. The lighted emergency sign as recited in claim 1 wherein said installation body further includes a longitudinally extended side plate engaging a front side of said main body member and a pair of side covers respectively engaging longitudinal ends thereof.

3. The lighted emergency sign as recited in claim 1 wherein said power supply device further includes a main switch, a power indicator, and a test switch coupled to said power supply circuit board.

4. The lighted emergency sign as recited in claim 1 wherein said main body member of said installation body has formed therein at least one hanging hole.

5. The lighted emergency sign as recited in claim 1 wherein said indicating board includes a reflection paper material disposed on at least a portion thereof.

6. The lighted emergency sign as recited in claim 2 wherein said installation body has formed thereon longitudinally extending projection and locking groove portions, and said side plate has formed thereon longitudinally extending sliding groove and locking body portions respectively engaging said projection and locking groove portions of said installation body.

* * * * *